(12) United States Patent
Mirichigni et al.

(10) Patent No.: US 11,523,264 B2
(45) Date of Patent: Dec. 6, 2022

(54) WIRELESS MEMORY INTERFACE

(71) Applicant: Micron Technology, Inc., Boise, ID (US)

(72) Inventors: Graziano Mirichigni, Vimercate (IT); Danilo Caraccio, Buonalbergo (IT)

(73) Assignee: Micron Technology, Inc., Boise, ID (US)

( * ) Notice: Subject to any disclaimer, the term of this patent is extended or adjusted under 35 U.S.C. 154(b) by 147 days.

(21) Appl. No.: 17/002,501

(22) Filed: Aug. 25, 2020

(65) Prior Publication Data

US 2020/0389778 A1 Dec. 10, 2020

Related U.S. Application Data

(63) Continuation of application No. 14/547,011, filed on Nov. 18, 2014, now Pat. No. 10,779,147.

(51) Int. Cl.
*H04B 5/00* (2006.01)
*H04W 4/80* (2018.01)
*H04W 4/00* (2018.01)
*G06F 12/1027* (2016.01)
*G06F 12/10* (2016.01)
*H04L 45/74* (2022.01)
*H04L 41/0853* (2022.01)

(52) U.S. Cl.
CPC .............. *H04W 4/80* (2018.02); *G06F 12/10* (2013.01); *G06F 12/1027* (2013.01); *H04L 41/0853* (2013.01); *H04L 45/74* (2013.01); *H04W 4/00* (2013.01)

(58) Field of Classification Search
CPC .. H04B 5/0031; H04B 5/0037; H04B 5/0062; H04B 5/0075; H04B 10/807; G06F 12/10; G06F 12/1027; H02J 50/30; H02J 50/80; H04L 41/0853; H04L 45/74; H04M 1/026; H04M 19/08; H04W 4/00; H04W 4/80; H04W 12/009; H04W 12/47
See application file for complete search history.

(56) References Cited

U.S. PATENT DOCUMENTS

| 4,384,288 A * | 5/1983 | Walton ..................... G07C 9/28 340/5.61 |
|---|---|---|
| 2003/0017857 A1 | 1/2003 | Kitson et al. |
| 2003/0103521 A1 | 6/2003 | Raphaeli et al. |
| 2004/0100834 A1 | 5/2004 | Waters |
| 2005/0160316 A1 | 7/2005 | Shipton |
| 2006/0062244 A1 | 3/2006 | Oksman |
| 2006/0069814 A1 | 6/2006 | Abraham et al. |
| 2006/0164213 A1 | 7/2006 | Burghard |
| 2006/0179391 A1 | 8/2006 | Rodriguez et al. |

(Continued)

OTHER PUBLICATIONS

NFC Forum, Inc., NFC Data Exchange Format (NDEF), Technical Specification, 25 pages, Jul. 24, 2006.*

(Continued)

*Primary Examiner* — Frank Duong
(74) *Attorney, Agent, or Firm* — Fletcher Yoder, P.C.

(57) ABSTRACT

Systems and methods for vendor-agnostic access to non-volatile memory of a wireless memory tag are provided. A wireless memory host includes a radio and controller. The controller generates vendor-agnostic commands to access a register-based interface that ultimately results in access to the non-volatile memory.

20 Claims, 5 Drawing Sheets

(56) References Cited

U.S. PATENT DOCUMENTS

| | | |
|---|---|---|
| 2006/0274747 A1 | 12/2006 | Duchscher et al. |
| 2007/0073935 A1 | 3/2007 | Kim et al. |
| 2007/0159305 A1* | 7/2007 | Cesar .................. G07C 9/28 |
| | | 340/10.2 |
| 2008/0175072 A1 | 7/2008 | Norman |
| 2009/0049222 A1 | 2/2009 | Lee et al. |
| 2009/0243813 A1* | 10/2009 | Smith ............ G06K 19/0723 |
| | | 340/10.51 |
| 2009/0327239 A1 | 12/2009 | Cho et al. |
| 2009/0327467 A1 | 12/2009 | Cho et al. |
| 2009/0327544 A1 | 12/2009 | Cho et al. |
| 2010/0060422 A1 | 3/2010 | Van Nest et al. |
| 2010/0315965 A1 | 12/2010 | Nemeth |
| 2010/0318712 A1* | 12/2010 | Boldyrev ........... G06F 9/44573 |
| | | 710/308 |
| 2010/0328043 A1 | 12/2010 | Jantunen et al. |
| 2010/0329232 A1 | 12/2010 | Tubb et al. |
| 2012/0099566 A1 | 4/2012 | Laine et al. |
| 2012/0210046 A1 | 8/2012 | Ito et al. |
| 2012/0244805 A1* | 9/2012 | Haikonen ......... H04W 52/0274 |
| | | 340/636.1 |
| 2012/0297147 A1* | 11/2012 | Mylly ............... G06F 12/0246 |
| | | 711/143 |
| 2013/0235796 A1 | 9/2013 | Kwon et al. |
| 2014/0047141 A1 | 2/2014 | Sadeghi et al. |
| 2014/0067617 A1 | 3/2014 | Heine et al. |
| 2014/0154975 A1 | 6/2014 | Lambert et al. |
| 2014/0204822 A1 | 7/2014 | Park et al. |
| 2014/0253291 A1* | 9/2014 | Kennedy ............ G06K 7/10306 |
| | | 340/10.1 |
| 2014/0285033 A1 | 9/2014 | Jantunen et al. |
| 2014/0287681 A1 | 9/2014 | Ollikainen et al. |
| 2014/0351457 A1 | 11/2014 | Baptist et al. |
| 2015/0098459 A1 | 4/2015 | Lee et al. |
| 2015/0146568 A1 | 5/2015 | Jeong et al. |

OTHER PUBLICATIONS

Jantunen et al., System Architecture for High-speed Close-proximity Low-power RF Memory Tags and Wireless Internet Access, WWW.iaria.org, 12 pages, 2011.*

Jantunen, An Impulse UWB Radio System for Remotely-Powered Wireless Memory Tag Applications, Doctoral Dissertations, Aalto University, 113 pages, 2015.*

Jantunen, An Impulse UWB Radio System for Remotely-Powered Wireless Memory Tag Applications, Thesis, Aalto University, 113 pages, 2015.*

JEDEC Standard, Low Power Double Data Rate 2 (LPDDR2), Jun. 2013, JEDEC Solid State Technology Association 2013.

* cited by examiner

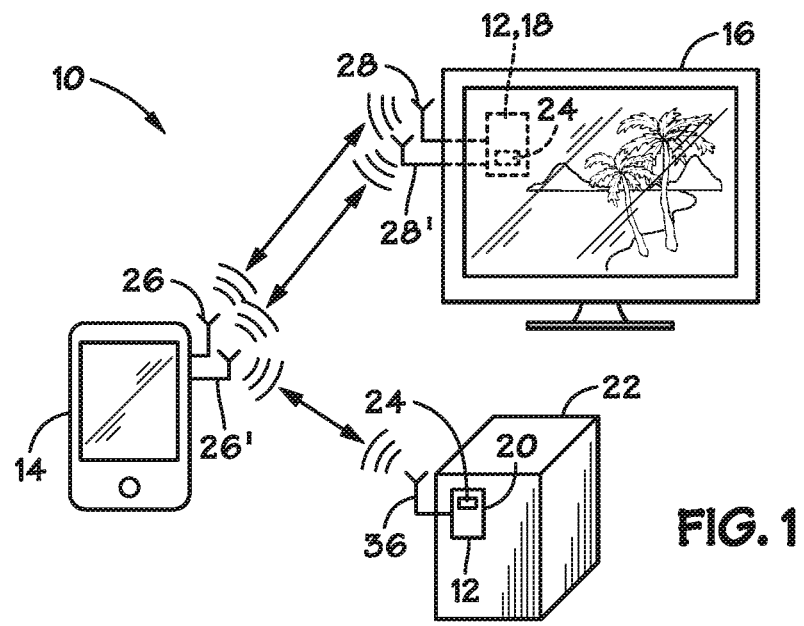
FIG. 1
FIG. 2
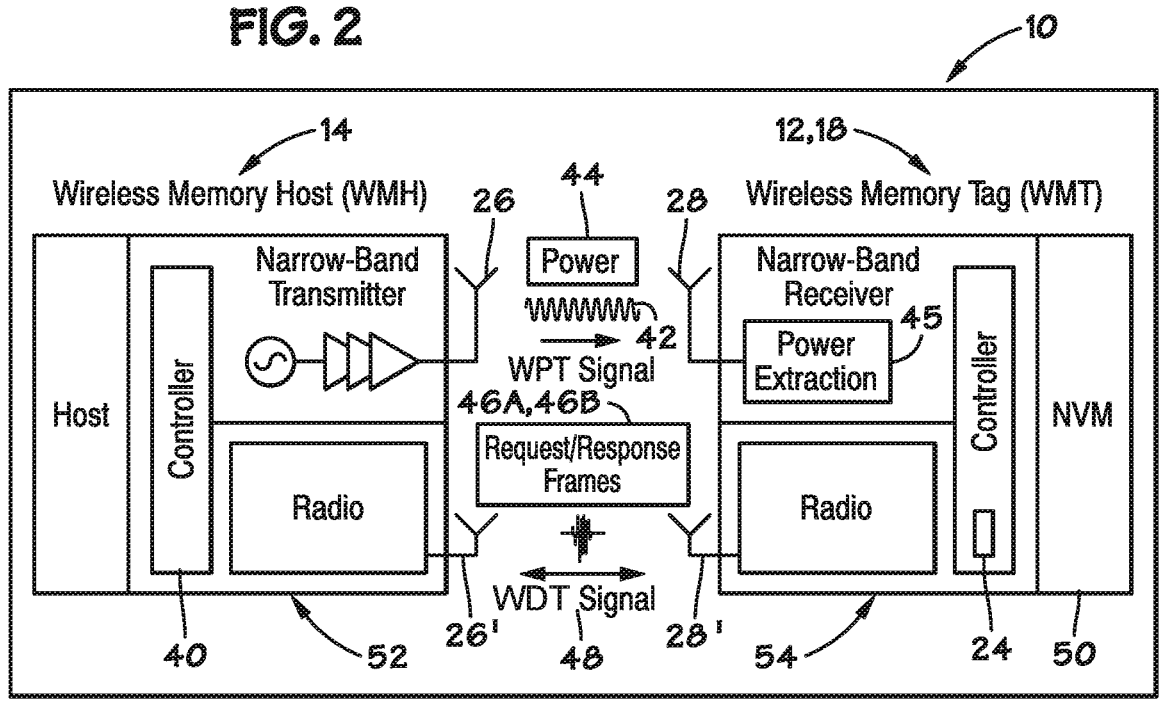

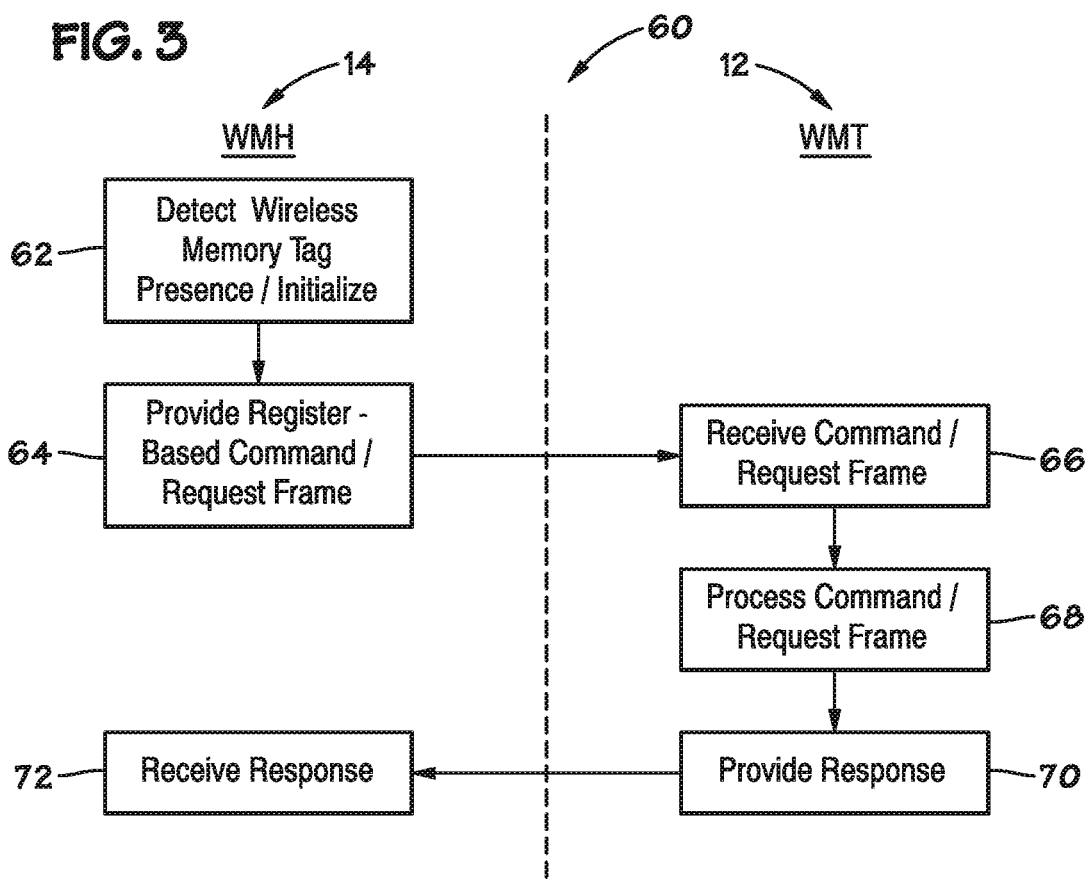
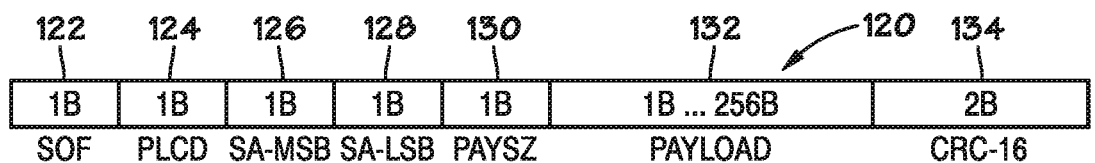
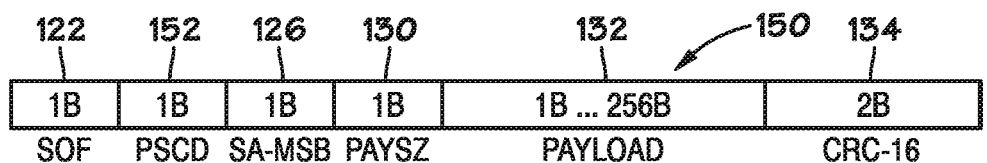

WIRELESS MEMORY INTERFACE

CROSS REFERENCE TO RELATED APPLICATIONS

This application is a continuation of U.S. patent application Ser. No. 14/547,011, entitled "Wireless Memory Interface", filed Nov. 18, 2014, which is herein incorporated by reference.

BACKGROUND

1. Field of the Invention

Embodiments of the present invention relate generally to the field of wireless memory devices and more particularly, to systems and methods of interfacing with wireless memory devices.

2. Description of the Related Art

Wireless memory is an emerging close proximity wireless connectivity technology facilitating close proximity data transfer to/from non-volatile memory using wireless power. For example, Near Field Communications (NFC) technology is quickly gaining traction in a number of applications, including wireless payment and advertisement applications. Further, high-throughput wireless memory implementations (e.g., the Wireless Memory Standards of the Joint Electron Device Engineering Council (JEDEC)) have been developed, enabling faster and higher capacity data transmission.

To date, these wireless memory technologies have often relied on proprietary communications methods and/or proprietary hardware to access non-volatile data. For example, a host device may be required to interface with a first wireless memory technology of a first manufacturer in a different manner than with a second wireless memory technology of a second manufacturer.

Unfortunately, these proprietary communications methods have resulted in increased development time and cost. Further, the proprietary communications have slowed the development of new wireless memory applications.

BRIEF DESCRIPTION OF THE DRAWINGS

FIG. 1 is a block diagram depicting a wireless memory system having multiple wireless memory tags communicating with a wireless memory host via a common register-based interface, in accordance with an embodiment;

FIG. 2 is a block diagram providing a more detailed view of components of the wireless memory host and wireless memory tag, in accordance with an embodiment;

FIG. 3 is a flowchart illustrating a process for using a register-based interface to access non-volatile memory of a wireless memory tag via a wireless memory host, in accordance with an embodiment;

FIG. 5 is a schematic diagram illustrating a definition of a request frame with a put-long command (e.g., also referenced herein as a put-long request frame) useful for accessing the register-based interface of FIG. 4, in accordance with an embodiment;

FIG. 6 is a schematic diagram illustrating a definition of a request frame with a put-short command (e.g., also referenced herein as a put-short request frame) useful for accessing the register-based interface of FIG. 4, in accordance with an embodiment;

DETAILED DESCRIPTION OF SPECIFIC EMBODIMENTS

Figure 4:
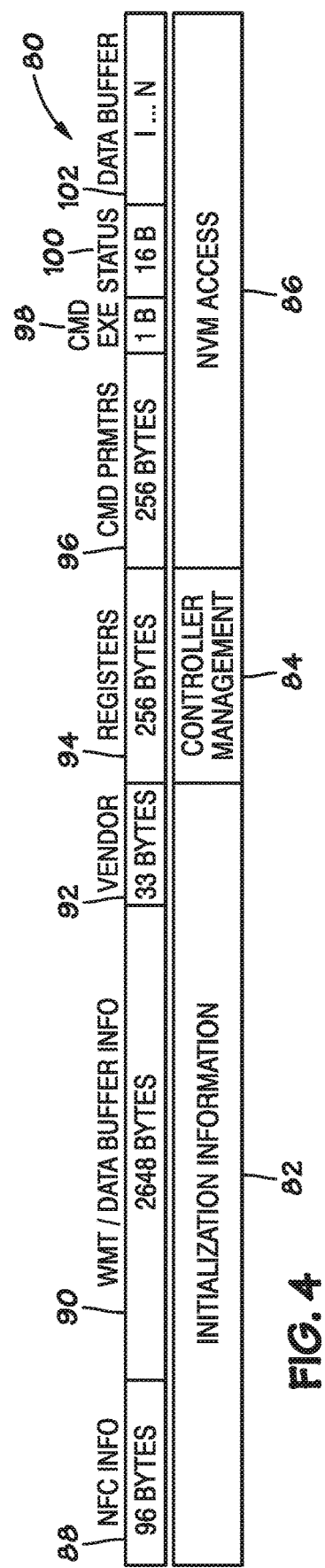
FIG. 4 is a schematic view of a table definition of a register-based interface of a wireless memory tag, in accordance with an embodiment.

As mentioned above, a number of applications utilize wireless memory. FIG. 1 is a block diagram depicting a wireless memory system 10 having multiple wireless memory tags 12 communicating with a host 14 via a common register-based interface, in accordance with an embodiment. For example, FIG. 1 illustrates a television 16 that includes a high speed wireless memory tag 18 capable of transmitting data to/from the host 14 (e.g., a smartphone). The high speed wireless memory tag 18 may be embedded within a device, as illustrated by the dashed lines of the tag 18.

Data may also be transmitted between the host 14 and a near-field communications (NFC) tag 20, which may, for example, be affixed to a product package 22. As mentioned above, in traditional systems the wireless memory tags 12 may be accessed via proprietary communications methods and/or hardware. However, the memory tags 12 illustrated in FIG. 1 may be equipped with a standardized register-based interface 24, which may allow for communication through an interface that is agnostic with regard to the host and/or structure of the wireless memory.

For example, the host 14 may communicate with the wireless memory tags 12 via one or more transmitters/receivers 26 and/or 26', which communicate with one or more transmitters/receivers 28 and/or 28' of the television 16 and/or one or more transmitters/receivers 30 of the NFC tag 20. Accordingly, by standardizing the communication interface among a multitude of wireless memory tags 12, communications may be provided regardless of the wireless memory tag 12 structure and/or specific parameters of the host 14.

Turning now to a more detailed discussion of communications between the host 14 and the wireless memory tags 12, FIG. 2 is a block diagram providing a more detailed view of components of the wireless memory host (WMH) 14 and wireless memory tag (WMT) 12 (e.g., a high speed memory tag 18), in accordance with an embodiment. Further, FIG. 3 is a flowchart illustrating a process 60 for using a register-based interface to access non-volatile memory of a wireless memory tag 12 via a wireless memory host 14, in accordance with an embodiment. FIGS. 2 and 3 will be discussed together.

The process 60 may begin by a wireless memory host 14 detecting and/or initializing communications with a wireless memory tag 12 (block 62). For example, the wireless memory host 14 may include a controller/processor 40 that may poll (e.g., scan) via a transmitter 26 (e.g., a narrow-band transmitter). To do this, the transmitter 26 may provide a wireless power transfer (WPT) signal 42 to the tag 12, which provides power 44 to the tag 12. In one embodiment, the tag 12 includes power extraction circuitry 45, which may extract power 44 from the WPT signal 42. The power 44 may be used to activate functionality of the tag 12.

Upon activating the tag 12, the host 14 may determine whether the tag 12 meets communication requirements of the host 14. For example, the host 14 may determine if the tags 12 are equipped with the register-based interface 24, such that request frames 46A with commands may be provided to the tags 12. Additionally, when no errors are detected by the tag, acknowledgment response frames 46B, and eventually response frames 46B with information from the tags 12 may be provided to the host 14. In some embodiments (e.g., the embodiment illustrated in FIG. 2) the wireless memory tag 12 may be equipped with high-power/high-speed transfers. Upon detecting this feature of a wireless memory tag 12, the host 14 may begin communicating via a high-power/high-speed transmitter/receiver 26' (e.g., via one or more wireless data transfer (WDT) signal 48 (e.g., ultra wide band (UWB) or 57-64 GHz communications)). Accordingly, the request frames 46A containing commands may be provided from the host 14 to the tags 12 via the WDT signal 48 (e.g., UWB (or 57-64 GHz) communications). Additionally, when the tags 12 do not detect errors, response frames 46B with acknowledgment, and eventually information may be provided via the WDT signal 48 (e.g., UWB (or 57-64 GHz) communications) from the tags 12 to the host 14 (e.g., a command-response protocol).

Once communications between the wireless memory host 14 and the wireless memory tag 12 are initiated, a request frame 46A with a command may be provided from the host 14 to the tag 12 (block 64). For example, a radio 52 of the host 14 may provide the request frame 46A with a command to a radio 54 of the tag 12. The request frame 46A with a command may trigger access (e.g., read and/or write operations) to non-volatile memory 50 of the tag 12 (e.g., via the register-based interface 24). For example, the tag 12 may receive the request frame 46A (block 66). The request frame 46A with a command may be processed (block 68) to obtain and/or store data in the non-volatile memory 50 (block 68). Further, the tag 12 may provide one or more response messages to the host 14. For example, a response frame 46B with an acknowledgment response indicating that the request frame 46A has been received and/or processed may be provided from the radio 54 to the radio 52. The response frame 46B may be received by the host 14 (block 72), which results in awareness by the host 14 of the status of the access of the non-volatile memory 50.

Having discussed the basic communications between the hosts 14 and the tags 12 using the register-based interface, FIG. 4 is a schematic view of a table definition 80 of a register-based interface 24 of a wireless memory tag, in accordance with an embodiment. The interface 24 may be made up of multiple sections of data. For example, the interface 24 may include an initialization information section 82, a controller management section 84, and/or a non-volatile memory access section 86.

The initialization information section 82 may hold data that is used for communication initialization between the host 14 and the tag 12. For example, in the illustrated embodiment, the initialization information section 82 includes an NFC information section 88, a wireless memory tag/data buffer information section 90, and a vendor-specific information section 92.

The NFC information section 88 may contain information related to NFC/high-power communications capabilities of the tag 12. For example, data stored in this section 88 may provide an indication of whether the tag 12 is equipped to handle high-power communications (e.g., includes a high-power/high-speed/wide-band radio 54) or if the tag 12 is equipped to handle only low-speed communications (e.g., only has a low-power transmitter/receiver 28). In some embodiments, the address for the NFC information section 88 may be in the range of 0x00-00 (hex-based most significant byte (MSB)) to 0x00-5F (hex-based least significant byte (LSB)) and may be allocated 96 bytes of data. Addresses 0x00-60-0x00-7F may be reserved for future expansion.

The wireless memory tag/data buffer information section 90 may include information related to the structure of the wireless memory tag 12, such as a number of data buffers, and a size and/or location offset for each buffer. Thus, the host 14 may become aware of the available data buffers, their size, and their location, by accessing data in section 90. In the illustrated embodiment, section 90 may reside in 2048 bytes of data, with the actual amount of used data being dependent on the number of data buffers in the tag 12. For example, a tag 12 having fewer data buffers would use relatively less data to describe the data buffers than a tag 12 having more data buffers. In some embodiments, the section 90 may be located within an address of 0x00-80 (hex-based MSB) to 0x08-7F (hex-based LSB).

Further addresses 0x08-90 (hex-based MSB) to 0x0E-FF (hex-based LSB) may be reserved for future use. For example, in some embodiments, a vendor-specific data section 92 may include data defining particular vendor-provided information, such as a particular file system of the non-volatile memory 50, specific sets of command types supported by the tag 12 (e.g., Open NAND Flash Interface Commands (ONFI) and/or Universal Flash Storage (UFS) commands), etc.

The controller management section 84 may include a set of direct access registers 94 that can be read or written to. For example, in the illustrated embodiment, the controller management section 84 includes 256 bytes of registers, which may be located in the address range of 0x10-00 (hex-based MSB) to 0x1F-FF (hex-based LSB).

The NVM access section 86 is useful for executing NVM commands and monitoring execution status of the NVM commands. This section 86 may occupy 56 kilobytes and be addressed in the range of 0x20-00 (hex-based MSB) to 0xFF-FF (hex-based LSB). The NVM access section 86 may include a command parameters section 96, a command execute section 98, a status section 100, and/or a data buffer section 102. In the illustrated embodiment, the command parameters section 96 takes up 256 bytes and may store command parameters, such as non-volatile memory locations where a read and/or write is to occur, a command code representative of the access operation to be performed on the NVM 50, etc.

The command execute section 98 may occupy one byte of data of the NVM access section 86. When a particular value (e.g., a flag) is written to the command execute section 98, the NVM access command may be executed. Accordingly, certain written values to the command execute section 98 may act as a trigger for the execution of an access command.

In some embodiments, the command execution section 98 may not be necessary. For example, in some embodiments, a command may be executed automatically upon the occurrence of particular data written to the command parameters section 96. For example, execution of an access command could automatically trigger when a command code representative of a particular command is written to the command parameters section 96.

In some embodiments, the status section 100 may occupy 16 bytes, where 1 byte is used for each data buffer in the wireless memory tag 12. Accordingly, a tag 12 having 4 data buffers may utilize 4 bytes of the 16 available bytes. Each status byte may be used to provide a status of a corresponding data buffer. For example, the status byte for a corresponding data buffer may indicate whether the data buffer is in use (and thus unavailable for new operations) or is not in use (and thus may be used in new operations).

When the status section 100 indicates that a data buffer is available for an operation (e.g., a read or write), the commands may be executed using the data buffers. The data buffers are stored in the data buffer section, which may vary based upon a tag 12 vendor's specification. For example, a tag 12 may have any number of data buffers. Further, the data buffers may vary in size. Accordingly, the data buffer section 102 size is vendor specific and may occupy the address range of 0x20-00 (hex-based MSB) to 0xFF-FF (hex-based LSB) in some embodiments.

As may be appreciated, the register-based interface may enable vendor-agnostic hosts 14 to access tags 12, by providing request frames 46A with commands and receiving response frames 46B in accordance with the structure illustrated in FIG. 4. By standardizing communications between the hosts 14 and the tags 12 across tags 12 of different manufacturers, the access of non-volatile memory (NVM) via wireless memory tags 12 may be greatly improved. For example, communication development costs and time may be reduced. Further, interoperability between hosts 14 and tags 12 of a variety of manufactures may increase.

In accordance with an embodiment, FIG. 5 is a schematic diagram illustrating a definition of a put-long request frame 120 that may be sent by a host 14 in order to access the register-based interface 24 having the definition 80 of FIG. 4. Further, FIG. 6 is a schematic diagram illustrating a definition of a put-short request frame 150 useful for accessing the register-based interface of FIG. 4, in accordance with an embodiment.

A "put" request frame may be used to put something in the interface 24 of the tag 12. A "long" request frame may provide access to the Register-Based Interface 24 at the byte level, while a "short" request frame may provide access to the Register-Based Interface 24 at the kilobyte level. Accordingly, more granularity may be achieved using "long" request frames, when desired.

Discussing first the put-long request frame 120 of FIG. 5, the put-long request frame 120 begins with a start of frame byte 122 that provides an indication to the tag 12 of the start of a new command. The put-long request frame 120 also includes a put long command code byte 124 that provides an indication that the request frame 46A includes a put long command (e.g., is a put-long request frame 120). The put-long request frame 120 also includes a most-significant-byte (MSB) start address byte 126, which may be used to coarsely specify a register range (e.g., 1 kilobyte out of 64 kilobytes of the Register-Based Interface 24). Further, the register (or field) may be finely addressed by using the least-significant-byte (LSB) start address byte 128. For example, the LSB start address byte 128 may be used to pinpoint an address of 1 byte out of 1 kilobyte (e.g., the kilobyte specified by the MSB start address byte 126) of the Register-Based Interface 24. Accordingly, by providing an indication of these addresses, the system may properly read from and/or write data to the proper addressed register of the Register-Based Interface 24.

A payload is transmitted within the put-long request frame 120, by the host 14. The payload is data to be "put" into the interface 24. One byte 130 is used to provide the size of the payload (e.g., a payload size of 1 byte to 256 bytes). Additionally, the payload 132 consumes a number of bytes equaling the payload size (e.g., 1 byte to 256 bytes). Lastly, two bytes of data 134 are used for a CRC-16 cyclical redundancy check, which may be used to detect errors in the data provided in the put-long request frame 120. When the put-long request frame 120 is provided with the proper parameters, specified payload data will be put into the interface 24 at the specified addresses (e.g., as defined by the starting addresses of the MSB and the LSB).

As mentioned above, "short" request frame may be used when finer granularity in addressing is not desired. FIG. 6 is a schematic diagram illustrating a definition of a put-short request frame 150 useful for accessing the register-based interface of FIG. 4 using coarse addressing. The put-short request frame 150 is very similar to the put-long request frame 120, except that a put-short command code 152 is used instead of the put-long command code 124 and no start address LSB byte 128 is present (because the put short provides coarse addressing). Thus, the put-short request frame 150 begins with a start of frame byte 122 that provides an indication to the tag 12 of the start of a new request frame 46A. The request frame 46A also includes a put-short command code byte 152 that provides an indication that the request frame 46A is a put short request frame 150. The put-short request frame 150 also includes a most-significant-byte (MSB) start address byte 126, which may be used to coarsely specify a register range (e.g., 1 kilobyte out of 64 kilobytes of the Register-Based Interface 24).

A payload is transmitted within the put-short request frame, by the host 14. The payload is data to be "put" into the interface 24. One byte 130 is used to provide the size of the payload (e.g., a payload size of 1 byte to 256 bytes). Additionally, the payload 132 consumes a number of bytes equaling the payload size (e.g., 1 byte to 256 bytes). Lastly, two bytes of data 134 are used for a CRC-16 cyclical redundancy check, which may be used to detect errors in the data provided in the put-short request frame 150. When the put-short request frame 150 is provided with the proper parameters, specified payload data will be put into the interface 24 at the specified address (e.g., as defined by the starting addresses of the MSB).

Figure 7:
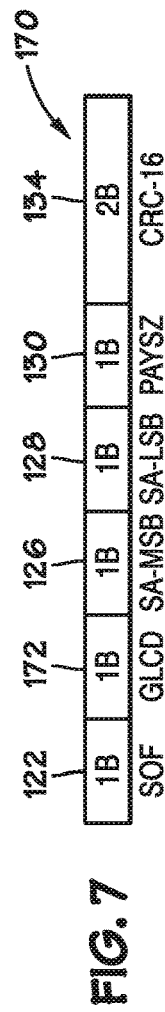
FIG. 7 is a schematic diagram illustrating a definition of a request frame with a get-long command (e.g., also referenced herein as a get-long request frame) useful for accessing the register-based interface of FIG. 4, in accordance with an embodiment.

Having discussed the "put" request frames, the discussion now turns to "get" request frames. "Get" request frames allow the host 14 to get information from the addressed register range or register of the register-based interface 24. For example, FIG. 7 is a schematic diagram illustrating a definition of a get-long request frame 170 useful for accessing the register-based interface 24 of FIG. 4, in accordance with an embodiment. The long request frames provide a byte of data indicative of the start address of a least significant byte to retrieve data from, in order to provide addressing with fine granularity.

As with the "put" request frames, the get-long request frames 170 begin with a start of frame byte 122 that provides an indication to the tag 12 of the start of a new request frame 46A. The get-long request frame 170 also includes a get-long command code byte 172 that provides an indication that the request frame 170 is a get-long request frame 170. The get-long request frame 170 also includes a most-significant-byte (MSB) start address byte 126, which may be used to coarsely specify a register range (e.g., 1 kilobyte out of 64 kilobytes of the Register-Based Interface 24) where data should be read from. Further, the register (or field) may be finely addressed by using the least-significant-byte (LSB) start address byte 128. For example, the LSB start address byte 128 may be used to pinpoint an address of 1 byte out of 1 kilobyte (e.g., the kilobyte specified by the MSB start address byte 126) of the Register-Based Interface 24.

The tag 12, in response to the get-long request frame 170, transmits a payload. One byte 130 is used to provide a specification of the size of the payload (e.g., a payload size of 1 byte to 256 bytes) to retrieve. Lastly, two bytes of data 134 are used for a CRC-16 cyclical redundancy check, which may be used to detect errors in the data provided in the get-long request frame 170. When the get-long request frame 170 is provided with the proper parameters, specified payload data will be received from the tag 12 by the host 14 via the interface 24.

Figure 8:
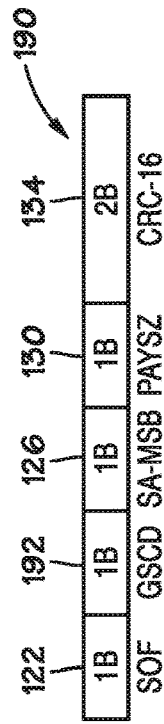
FIG. 8 is a schematic diagram illustrating a definition of a request frame with a get-short command (e.g., also referenced herein as a get-short request frame) useful for accessing the register-based interface of FIG. 4, in accordance with an embodiment.

A "get" request frame with less granular addressing may also be used to access data in the register-based interface 24. FIG. 8 is a schematic diagram illustrating a definition of a get-short request frame 190 useful for accessing the Register-Based Interface 24 of FIG. 4, in accordance with an embodiment. The get-short request frame 190 begins with a start of frame byte 122 that provides an indication to the tag 12 of the start of a new request frame 46A. The get-short request frame 190 also includes a get-short command code byte 192 that provides an indication that the request frame 46A is a get-short request frame 190. The get-short request frame 190 also includes a most-significant-byte (MSB) start address byte 126, which may be used to coarsely specify a register range (e.g., 1 kilobyte out of 64 kilobytes of the Register-Based Interface 24) where data should be read. Because the get-short request frame 190 is addressed at a more granular level, a LSB start address byte is not provided.

The tag 12 transmits a payload in response to the get-short request frame 190. One byte 130 is used to provide a specification of the size of the payload (e.g., a payload size of 1 byte to 256 bytes) to retrieve. Lastly, two bytes of data 134 are used for a CRC-16 cyclical redundancy check, which may be used to detect errors in the data provided in the get-short request frame 190. When the get-short request frame 190 is provided with the proper parameters, specified payload data will be received from the tag 12 by the host 14 via the interface 24.

Tables 1 and 2 below summarize the format of the request frames 46A and the response frames 46B. Table 1 illustrates a format of the request frames 46A and Table 2 illustrates the format of the response frames 46B. "NA" represents data that is not applicable (e.g., is not transmitted), "N" represents the number of payload bytes, and "OK" represents positive response data.

As discussed above and illustrated in Table 2, the response frames 46B each include an acknowledgment byte indicating that a request frame was received. Additionally, when the response frames 46B responding to "Get" commands includes a payload of 1-256 bytes of data corresponding to the "Get" command provided in a corresponding request frame 46A.

TABLE 1

Request Frame Format
RBIF Command Set and Protocol

| | | | Body of Request Frame | | | | | |
|---|---|---|---|---|---|---|---|---|
| | | COMMAND | | INFORMATION | | | | |
| | Command Name | Total # of Bytes | First Address Byte | Second Address Byte | Payload Size Byte | Payload Bytes | Total # of Bytes | |
| Start Of Frame | PUT SHORT | 1 | MSB | NA | N | Payload (1-256) | ≤258 | CRC-16 |
| | GET SHORT | 1 | MSB | NA | N | NA | 2 | |
| | PUT LONG | 1 | MSB | LSB | N | Payload (1-256) | ≤259 | |
| | GET LONG | 1 | MSB | LSB | N | NA | 3 | |

TABLE 2

Response Frame Format
RBIF Command Set and Protocol

| | | Body of Response Frame | | | | |
|---|---|---|---|---|---|---|
| | | ACKNOWLEDGEMENT | | INFORMATION | | |
| Command Name | | Acknowledgement Byte | Total # of Bytes | Information Bytes | Total # of Bytes | |
| PUT SHORT | Start Of Frame | OK | 1 | NA | NA | CRC-16 |
| GET SHORT | | OK | 1 | Payload (1-256) | ≤256 | |

TABLE 2-continued

Response Frame Format
RBIF Command Set and Protocol

| | Body of Response Frame | | | |
|---|---|---|---|---|
| | ACKNOWLEDGEMENT | | INFORMATION | |
| Command Name | Acknowledgement Byte | Total # of Bytes | Information Bytes | Total # of Bytes |
| PUT LONG | OK | 1 | NA | NA |
| GET LONG | OK | 1 | Payload (1-256) | ≤256 |

Figure 9:
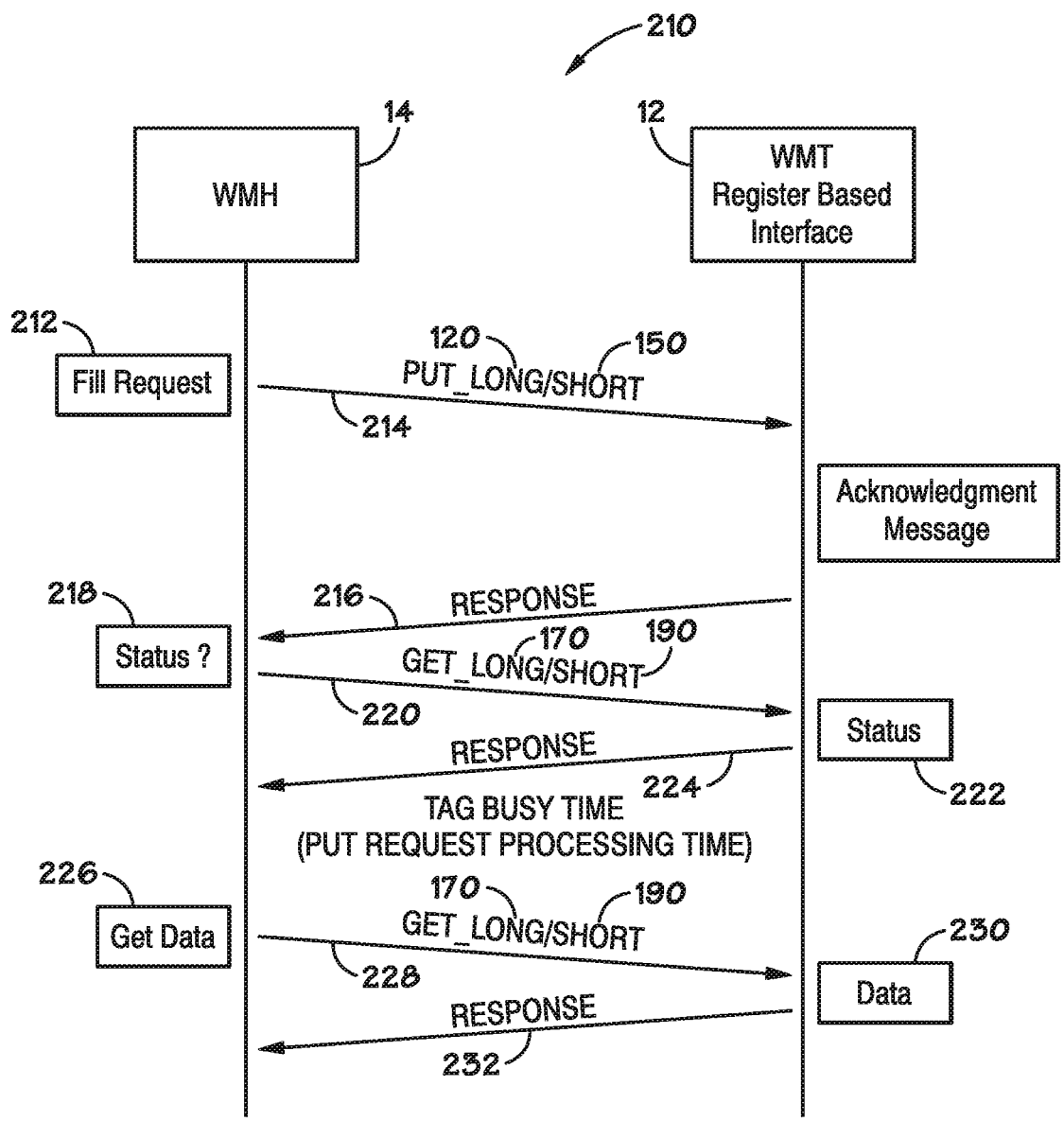
FIG. 9 is a schematic drawing illustrating the use of request frames and corresponding response frames in the register-based interface for a read operation, in accordance with an embodiment.

Having now discussed the basic request frames 46A and the response frames 46B, the discussion now turns to using the request frames 46A and response frames 46B to perform one or more operations between the host 14 and the tag 12. FIG. 9 is a sequence diagram illustrating a read operation 210 between the host 14 and the tag 12 using the request frames 46A and response frames 46B. The interaction 210 results in a read operation, where the host 14 reads data 12 from the non-volatile memory 50 of the tag 12, in accordance with an embodiment.

To begin the read operation 210, the host 14 generates a fill request 212 by providing a "put" request frame 46A (e.g., the put-long request frame 120 and/or the put-short request frame 150) to fill a particular portion of the register-based interface with data from the non-volatile memory 50 of the tag 12 (arrow 214). For example, the "put" request frame 46A may include a payload 132 that includes: non-volatile memory read command code, an address of a data buffer in the register-based interface 24 where data read from the non-volatile memory 50 should be stored, and/or a trigger to initiate the start of the read and store operation. Alternatively, multiple "put" request frames 46A may be used to fill each field of the Register-Based Interface 24 with this data.

Upon receiving the fill request 212, the tag 12 provides an acknowledgment response with a response frame 46B that may inform the host 14 whether the "put" request frame 46A was properly accepted (arrow 216). Further, the tag 12 begins processing the "put" request frame 46A, resulting in data from the non-volatile memory 50 being read and stored in the register-based interface (e.g., at an address of the data buffer area provided in the payload of the "put" request frame 46A).

Upon receiving the acknowledgment response with a response frame 46B, the host 14 will provide a status query 218 to the tag 12 to determine the status of the data buffer being filled (e.g., whether the fill is complete, such that the data may be obtained by the host 14). This may be done using the get-long request frame 170 and/or the get-short request frame 190 (arrow 220). The status 222 of the data buffer is provided by the tag 12 (arrow 224). This status inquiry process continues until the status indicates that the data buffer is ready for use (e.g., the data buffer is filled with the non-volatile memory data).

Once the status indicates that the data buffer is ready for use, the host 14 provides a request 226 to get the filled data. This may be done by providing a get-long request frame 170 and/or a get-short request frame 190 to the tag 12 to get the information filled in the Register-Based Interface 24 (arrow 228). The get-long request frame 170 and/or get-short request frame 190 includes the address where the data buffer holding the filled data is located as well as a payload size.

Upon receiving this request 226, the tag 12 provides a response frame 46B including the data 230 (arrow 232). Accordingly, these interactions between the host 14 and the tag 12 result in non-volatile memory 50 of the tag 12 being provided to host 14 (i.e., a read operation).

Figure 10:
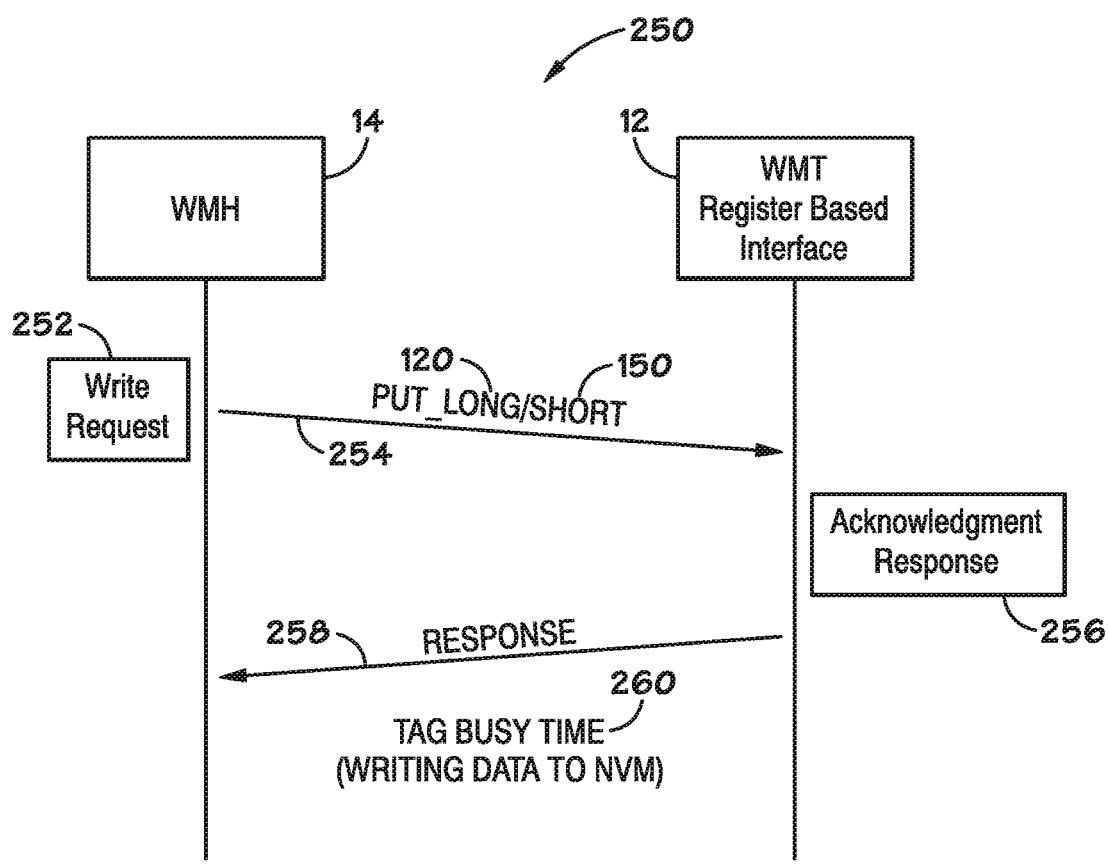
FIG. 10 is a schematic drawing illustrating the use of request frames and corresponding response frames in the register-based interface for a write operation, in accordance with an embodiment.

FIG. 10 is a sequence diagram illustrating a write operation 250 using the request frames 46A and the response frames 46B of the Register-Based Interface 24, in accordance with an embodiment. To perform the write operation 250, the host 14 generates a write request 252, by providing a put-long request frame 120 and/or a put-short request frame 150 to the tag 12 (arrow 254). The write request 252 may include the start address of the Register-Based Interface 24, a payload size, and a payload. The payload may include non-volatile memory write command code, a start address of where to write to, the data to be written, and/or a start of execution indication.

Upon receiving the request, the tag 12 may provide an acknowledgment response 256 with a response frame 46B, providing an indication of whether or not the write request 252 was properly received (arrow 258). Further, the tag 12 may interpret the payload to store the data in the non-volatile memory 50, as indicated by the tag 12 busy time 260.

By using the register-based interface 24 described herein, wireless tag communications may become vendor agnostic. For example, communications between a host 14 and a tag 12 may share a common scheme between multiple different vendor-specific tag designs. Thus, development costs of tag communications protocols may be reduced. Further, cross-communication between these vendor-specific tag designs may be more efficient.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A wireless memory host, comprising:
  a radio configured to communicatively couple with a wireless memory tag; and
  a controller configured to:
    access non-volatile memory of the wireless memory tag, by:
      generating one or more vendor-agnostic commands that describe a get operation, a put operation, or both to perform on a register-based interface of the wireless memory tag, wherein the get operation, the put operation, or both, when processed by the wireless memory tag, cause a data transfer to or from the register-based interface and the data transfer to or from the register-based interface causes implementation of the access to the non-volatile memory;

providing, via the radio, the one or more vendor-agnostic commands to the register-based interface of the wireless memory tag to access the non-volatile memory of the wireless memory tag; and in response to providing the one or more vendor-agnostic commands, receiving data from the non-volatile memory, causing provision of data to the non-volatile memory, or both.

2. The wireless memory host of claim 1, wherein the one or more vendor-agnostic commands comprise one or more "get" request frames configured to get data from the register-based interface.

3. The wireless memory host of claim 2, wherein the one or more "get" request frames comprise a get-short request frame configured to get data from the register-based interface at a location defined by a most significant byte register-based interface start address and not a least significant byte register-based interface start address.

4. The wireless memory host of claim 2, wherein the one or more "get" request frames comprise a get-long request frame configured to get data from the register-based interface at a location defined by a most significant byte register-based interface start address and a least significant byte register-based interface start address.

5. The wireless memory host of claim 1, wherein the one or more vendor-agnostic commands comprise one or more "put" request frames configured to put data into the register-based interface.

6. The wireless memory host of claim 5, wherein the one or more "put" request frames comprise a put-short request frame configured to put data into the register-based interface at a location defined by a most significant byte register-based interface start address and not a least significant byte register-based interface start address.

7. The wireless memory host of claim 5, wherein the one or more "put" request frames comprise a put-long request frame configured to put data into the register-based interface at a location defined by a most significant byte register-based interface start address and a least significant byte register-based interface start address.

8. The wireless memory host of claim 1, wherein the register-based interface comprises: an initialization information portion that holds data used for communication initialization between the wireless memory host and the wireless memory tag.

9. The wireless memory host of claim 1, wherein the register-based interface comprises: a non-volatile memory access portion that holds information for executing non-volatile memory access commands.

10. The wireless memory host of claim 1, comprising a transmitter separate from the radio, wherein the wireless memory host is configured to:

poll, via the transmitter, for evidence of the wireless memory tag;

upon observing the evidence, establish a communicative coupling between the radio and the wireless memory tag.

11. A method, comprising:
accessing non-volatile memory of a wireless memory tag, by:
generating one or more vendor-agnostic commands that describe a get operation, a put operation, or both to perform on a register-based interface of the wireless memory tag, wherein the get operation, the put operation, or both, when processed by the wireless memory tag, cause a data transfer to or from the register-based interface and the data transfer to or from the register-based interface causes implementation of the access to the non-volatile memory;

providing, via a radio, the one or more vendor-agnostic commands to the register-based interface of the wireless memory tag to access the non-volatile memory of the wireless memory tag; and in response to providing the one or more vendor-agnostic commands, receiving data from the non-volatile memory, causing provision of data to the non-volatile memory, or both.

12. The method of claim 11, wherein the one or more vendor-agnostic commands comprise one or more "get" request frames configured to get data from the register-based interface, wherein the one or more "get" request frames comprise:

a get-short request frame configured to get data from the register-based interface at a location defined by a most significant byte register-based interface start address and not a least significant byte register-based interface start address;

a get-long request frame configured to get data from the register-based interface at a location defined by a most significant byte register-based interface start address and a least significant byte register-based interface start address; or both.

13. The method of claim 11, wherein the one or more vendor-agnostic commands comprise one or more "put" request frames configured to put data into the register-based interface, wherein the one or more "put" request frames comprise:

a put-short request frame configured to put data into the register-based interface at a location defined by a most significant byte register-based interface start address and not a least significant byte register-based interface start address;

a put-long request frame configured to put data into the register-based interface at a location defined by a most significant byte register-based interface start address and a least significant byte register-based interface start address; or both.

14. The method of claim 11, wherein the register-based interface comprises: an initialization information portion that holds data used for communication initialization between a wireless memory host and the wireless memory tag.

15. The method of claim 11, wherein the register-based interface comprises: a non-volatile memory access portion that holds information for executing non-volatile memory access commands.

16. The method claim 11, comprising:
polling, via a transmitter separate from the radio, for evidence of the wireless memory tag;
upon observing the evidence, establishing a communicative coupling between the radio and the wireless memory tag.

17. A wireless memory system, comprising:
a wireless memory tag, comprising:
  non-volatile memory; and
  a register-based interface, wherein data transfer to or from the register-based interface causes the wireless memory tag to implement access to the non-volatile memory;
a wireless memory host, comprising:
  a radio configured to communicatively couple with the wireless memory tag; and
  a controller configured to:
    access the non-volatile memory of the wireless memory tag, by:
      generating one or more vendor-agnostic commands that describe a get operation, a put operation, or both to perform on the register-based interface, wherein the get operation, the put operation, or both, when processed by the wireless memory tag, cause a data transfer to or from the register-based interface and the data transfer to or from the register-based interface causes implementation of the access to the non-volatile memory;
      providing, via the radio, the one or more vendor-agnostic commands to the register-based interface of the wireless memory tag to access the non-volatile memory of the wireless memory tag; and
      in response to providing the one or more vendor-agnostic commands, receiving data from the non-volatile memory, causing provision of data to the non-volatile memory, or both.

18. The wireless memory system of claim 17, wherein the one or more vendor-agnostic commands comprise one or more "get" request frames configured to get data from the register-based interface, wherein the one or more "get" request frames comprise:
  a get-short request frame configured to get data from the register-based interface at a location defined by a most significant byte register-based interface start address and not a least significant byte register-based interface start address;
  a get-long request frame configured to get data from the register-based interface at a location defined by a most significant byte register-based interface start address and a least significant byte register-based interface start address; or
  both.

19. The wireless memory system of claim 17, wherein the one or more vendor-agnostic commands comprise one or more "put" request frames configured to put data into the register-based interface, wherein the one or more "put" request frames comprise:
  a put-short request frame configured to put data into the register-based interface at a location defined by a most significant byte register-based interface start address and not a least significant byte register-based interface start address;
  a put-long request frame configured to put data into the register-based interface at a location defined by a most significant byte register-based interface start address and a least significant byte register-based interface start address; or
  both.

20. The wireless memory system of claim 17, comprising:
  polling, via a transmitter separate from the radio, for evidence of the wireless memory tag;
  upon observing the evidence, establishing a communicative coupling between the radio and the wireless memory tag.

* * * * *